United Sta

Ruben

[11] 3,972,592
[45] Aug. 3, 1976

[54] ZOOM PROJECTION LENS

[75] Inventor: Paul Lewis Ruben, Penfield, N.Y.

[73] Assignee: Eastman Kodak Company, Rochester, N.Y.

[22] Filed: Oct. 18, 1974

[21] Appl. No.: 516,239

[52] U.S. Cl. ............................. 350/184; 350/189
[51] Int. Cl.² .................. G02B 15/00; G02B 3/04
[58] Field of Search ............ 350/184, 186, 189, 187

[56] References Cited
UNITED STATES PATENTS

| | | | |
|---|---|---|---|
| 2,530,397 | 11/1950 | Merte | 350/189 |
| 2,649,025 | 8/1953 | Cook | 350/186 |
| 3,194,139 | 7/1965 | Babcock | 350/189 X |
| 3,220,307 | 11/1965 | Thurow | 350/184 |

*Primary Examiner*—John K. Corbin
*Assistant Examiner*—Conrad Clark
*Attorney, Agent, or Firm*—John Morrow

[57] ABSTRACT

A zoom projection lens having six elements with a second biconcave negative element being movable for zooming. Five of the six elements are made of plastic materials and the use of aspheres on two surfaces, including one surface of the movable element, is disclosed to achieve good optical performance at a relative aperture of at least $f/1.57$.

1 Claim, 1 Drawing Figure

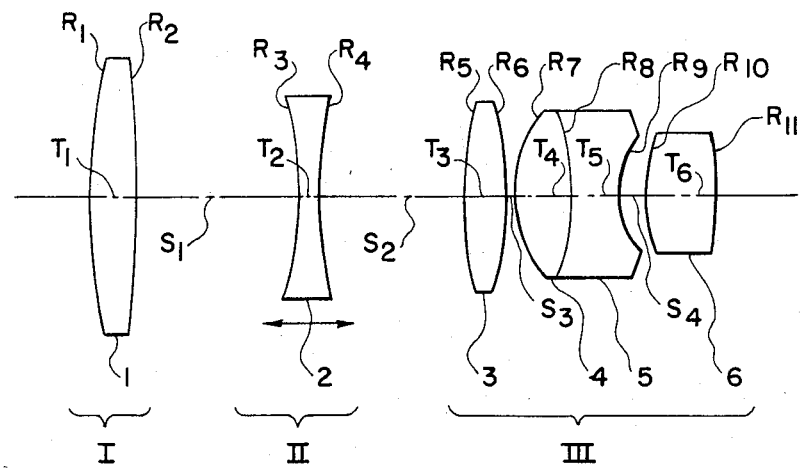

ZOOM PROJECTION LENS

BACKGROUND OF THE INVENTION

1. Field of the Invention

The present invention relates to projection lenses and in particular to a zoom projection lens in which one or more elements is movable to provide variable magnification.

2. Description of the Prior Art

Zoom lenses for use in photographic apparatus are well known. Moreover, high relative aperture zoom lenses have also been known for many years. However, most prior art zoom lenses, particularly those characterized by a high relative aperture, are relatively complex in construction and require costly high index glasses to provide good aberration correction. Moreover, many such zoom lenses have two or more movable elements, requiring adequate room for the relative movement of the elements and accurate mounting of the elements. Use of high index glasses also makes the zoom lens relatively expensive to produce because of the cost of each glass, as well as the manufacturing cost of each individual glass element along with assembly of the final lens.

SUMMARY OF THE INVENTION

In accordance with the present invention, there is provided a zoom lens comprising six elements with one movable element and with five elements being formed of plastic materials, such as polymethyl methacrylate, polycyclohexyl methacrylate, polystyrene or acrylonitrile. In addition, good aberration correction is achieved at a high relative aperture by the incorporation of aspheres on one or more surfaces of the lens, including one or more of the surfaces on the movable element.

BRIEF DESCRIPTION OF THE DRAWING

In the description of the preferred embodiment of the invention presented below, reference is made to the accompanying drawing which is a schematic axial cross-section of a zoom lens according to the present invention.

DESCRIPTION OF THE PREFERRED EMBODIMENTS

For all purposes of describing or claiming of the invention, the term lens will be used to describe the complete lens and not the elements thereof. In the drawing, the elements are numbered from left to right with Arabic numerals. In each of the examples, the elements, indices of refraction N, Abbé numbers V, radii of curvature R, thicknesses T, and air spaces S are numbered to correspond with the drawing. The indices of refraction are for the 0.5893 micron sodium D line of the spectrum. The Abbé numbers are calculated utilizing the D line index and, as the main dispersion, the index difference between the 0.4861 micron hydrogen F line and the 0.6563 micron hydrogen C line. Radii of curvature having centers of curvature to the right of the surface are considered positive; those with centers of curvature to the left of the surface are considered negative.

In all embodiments of the invention as illustrated in the drawing, the lens comprises three components with six elements. Component I comprises a positive biconvex Element 1. Component II comprises a movable negative biconcave Element 2. Component III is a rear positive relay comprising a front positive biconvex Element 3, a positive biconvex Element 4 cemented to a negative biconcave Element 5, and a rear positive biconvex Element 6.

The use of aspheric surfaces in a lens design provides additional parameters for correction of aberrations. Incorporation of an aspheric surface is particularly useful in a lens of large relative aperture, because the aspheric surfaces may be utilized to reduce spherical aberration both on axis and in the image field. Moreover, the choice of aspheric surfaces may preclude the necessity of increasing the strength of spherical surfaces to permit a reduction in the number of elements, thereby making the lens more manufacturable. In the design of the present invention, the improved aberration correction and the high relative aperture are achieved by the use of aspheres on one or more surfaces of the lens, including a movable surface.

An aspheric surface may be described by the following equation:

$$x = \frac{Cy^2}{1+ \sqrt{1-(1+K)C^2y^2}}$$

This equation describes a surface in terms of its surface sag $x$ at a semi-aperture distance $y$ from the axis of the lens. The constant C is the vertex curvature, that is, the surface curvature at the vertex of the lens, and is equal to the reciprocal of the vertex radius of curvature R. The constant K is the conic constant and is defined by the equation $K = -e^2$ where $e$ is the eccentricity of the surface. Certain values of K describe conic sections or surfaces of revolution about the optical axis of the lens. Terms higher than the quadratic in the equation for $x$ may also be included, if desired.

Lenses may be made according to the invention by following the specification in the preferred embodiment presented below:

EXAMPLE I

| Element | $N_D$ | V | Radius mm | Thickness or Separation mm |
|---|---|---|---|---|
| 1 | 1.49168 | 57.4 | $R_1$=54.086 | $T_1$=4.000 |
|  |  |  | $R_2$=−324.17 | 1.911 |
|  |  |  |  | $S_1=T_{to}$ 25.018 |
| 2 | 1.49168 | 57.4 | $R_3$=Asphere | $T_2$=1.600 |
|  |  |  | $R_4$=38.425 |  |
|  |  |  |  | 24.114 $S_2$= to 1.007 |
| 3 | 1.49168 | 57.4 | $R_5$=Asphere | $T_3$=3.631 |
|  |  |  | $R_6$=−28.253 | $S_3$=0.100 |
|  |  |  | $R_7$=9.7250 |  |
| 4 | 1.49168 | 57.4 | $R_8$=−21.155 | $T_4$=5.000 |
| 5 | 1.59028 | 30.9 | $R_9$=7.2951 | $T_5$=4.000 |
|  |  |  | $R_{10}$=15.403 | $S_4$=1.932 |
| 6 | 1.60530 | 43.6 | $R_{11}$=−33.791 | $T_6$=6.000 |

This lens is characterized by an effective focal length which varies from 15 to 30mm as Element 2 is moved through its range of movement. The semi-field angle varies from 12.6° to 6.4° while the relative aperture varies from f/1.50 to f/1.57. The back focus varies from 8.49 to 9.38mm because of the absence of a compensator lens, necessitating movement of the entire lens for refocusing. The cost of this lens has been substantially reduced by the use of polymethyl methacrylate to form the first four elements, with the fifth element being formed of polystyrene. Only one element, element 6 is made of glass. Higher order spherical aberration is controlled in this lens design by the use of aspheric surfaces on the second and third elements of the lens rather than by the selection of higher index glass materials. In this particular design, both of the aspheres are hyperboloids. The coefficients of the aspheres are as tabulated below:

|  | C | K |
|---|---|---|
| Surface 3 | −.03504960 | −2.41830036 |
| Surface 5 | .03137796 | −9.89410310 |

The invention has been described in detail with particular reference to preferred embodiments thereof, but it will be understood that variations and modifications can be effected within the spirit and scope of the invention.

I claim:

1. A zoom projection lens comprising six elements and having a focal length that varies from 15 to 30mm when constructed according to the following parameters:

EXAMPLE 1

| Element | $N_D$ | V | Radius mm | Thickness or Separation mm |
|---|---|---|---|---|
| 1 | 1.49168 | 57.4 | $R_1$=54.086 | $T_1$=4.000 |
|  |  |  | $R_2$=−324.17 | $S_1$= 1.911 to 25.018 |
| 2 | 1.49168 | 57.4 | $R_3$=Asphere | $T_2$=1.600 |
|  |  |  | $R_4$=38.425 | $S_2$= 24.114 to 1.007 |
| 3 | 1.49168 | 57.4 | $R_5$=Asphere | $T_3$=3.631 |
|  |  |  | $R_6$= −28.253 | $S_3$=0.100 |
| 4 | 1.49168 | 57.4 | $R_7$=9.7250 | $T_4$=5.000 |
|  |  |  | $R_8$= −21.155 |  |
| 5 | 1.59028 | 30.9 | $R_9$=7.2951 | $T_5$=4.000 |
|  |  |  |  | $S_4$=1.932 |
| 6 | 1.60530 | 43.6 | $R_{10}$=15.403 | $T_6$=6.000 |
|  |  |  | $R_{11}$= −33.791 |  | wherein, from front to rear, the elements are numbered from 1 to 6, the corresponding indices of refraction, $N_D$, and Abbé numbers, V, are listed for each element, the radii of curvature of the surfaces are numbered from $R_1$ to $R_{11}$, the thicknesses of the elements are numbered from $T_1$ to $T_6$, the spacings between the elements are numbered from $S_1$ to $S_4$, and wherein $R_3$ and $R_5$ represent the vertex radius of curvature of an aspheric surface defined by the following formula and parameters:

$$x = \frac{Cy^2}{1+\sqrt{1-(1+K)C^2y^2}}$$

| Surface | C | K |
|---|---|---|
| 3 | −.03504960 | −2.41830036 |
| 5 | .03137796 | −9.89410310 | wherein $x$ is the sag of the aspheric surface from a plane reference surface at a radial distance $y$ from the axis to the lens, $c$ is equal to the reciprocal of the vertex radius of curvature and K is the conic constant.

* * * * *

UNITED STATES PATENT OFFICE
CERTIFICATE OF CORRECTION

Patent No. 3,972,592          Dated August 3, 1976

Inventor(s) Paul Lewis Ruben

It is certified that error appears in the above-identified patent and that said Letters Patent are hereby corrected as shown below:

Column 4, Line 35, Please delete the word "to" and substitute therefor ---of---.

Signed and Sealed this

Twelfth Day of October 1976

[SEAL]

Attest:

RUTH C. MASON
Attesting Officer

C. MARSHALL DANN
Commissioner of Patents and Trademarks